US005772873A

United States Patent [19]
Hudgens et al.

[11] Patent Number: 5,772,873
[45] Date of Patent: Jun. 30, 1998

[54] SLOW RELEASE COOLANT FILTER

[75] Inventors: R. Douglas Hudgens; Charles L. Matheson, both of Cookeville, Tenn.

[73] Assignee: Fleetguard, Inc., Nashville, Tenn.

[21] Appl. No.: 893,842

[22] Filed: Jul. 11, 1997

Related U.S. Application Data

[63] Continuation-in-part of Ser. No. 667,673, Jun. 21, 1996, Pat. No. 5,662,799.

[51] Int. Cl.$^6$ .................................................. B01D 27/04
[52] U.S. Cl. ....................... 210/192; 165/119; 165/134.1; 210/206; 210/209; 422/264; 422/278
[58] Field of Search ................................ 165/119, 134.1; 210/192, 205, 206, 209, 443, 444; 422/261, 263, 264, 274, 277, 278, 283

[56] References Cited

U.S. PATENT DOCUMENTS

| 3,369,666 | 2/1968 | Hultgren et al. | 210/130 |
|---|---|---|---|
| 3,645,420 | 2/1972 | Alexander et al. | 210/266 |
| 3,897,335 | 7/1975 | Brandt | 210/167 |
| 4,357,236 | 11/1982 | Krueger | 210/167 |
| 4,366,057 | 12/1982 | Bridges et al. | 210/437 |
| 4,452,697 | 6/1984 | Conrad | 210/172 |
| 4,717,495 | 1/1988 | Hercamp et al. | 252/75 |
| 4,782,891 | 11/1988 | Cheadle et al. | 210/205 |
| 4,842,731 | 6/1989 | Dobrez et al. | 210/209 |
| 4,885,141 | 12/1989 | Gray et al. | 422/263 |
| 4,975,284 | 12/1990 | Stead et al. | 424/497 |
| 5,009,848 | 4/1991 | Secretarski et al. | 422/283 |
| 5,024,268 | 6/1991 | Cheadle et al. | 210/209 |
| 5,094,745 | 3/1992 | Reynolds | 210/266 |
| 5,114,575 | 5/1992 | Yano et al. | 210/188 |
| 5,209,842 | 5/1993 | Moor | 210/168 |
| 5,378,355 | 1/1995 | Winkler | 210/136 |
| 5,395,518 | 3/1995 | Gulsvig | 210/132 |
| 5,435,346 | 7/1995 | Tredigo et al. | 210/205 |
| 5,662,799 | 9/1997 | Hudgens et al. | 210/192 |

*Primary Examiner*—Peter A. Hruskoci
*Attorney, Agent, or Firm*—Woodard, Emhardt, Naughton Moriarty & McNett

[57] ABSTRACT

A coolant filter for use in filtering a coolant solution which flows through the coolant filter includes a filter housing assembly which is made up of an outer housing which is crimped to a nutplate which defines an internally threaded flow outlet. A generally cylindrical filter element is positioned inside of the filter housing assembly and a first endplate is bonded to the end of the filter element which is adjacent to the nutplate. A second endplate is bonded to the opposite end of the filter element and helps to define an interior space within the filter element. A supply of supplemental coolant additive is contained within an osmotic film enclosure which is positioned within the interior space. The osmotic film enclosure provides a slow release mechanism for controlling the rate of release of the supplemental coolant additive into the coolant solution. In one embodiment of the present invention, the slow release mechanism includes a diffusion tube which defines a diffusion orifice.

10 Claims, 4 Drawing Sheets

SLOW RELEASE COOLANT FILTER

REFERENCE TO RELATED APPLICATION

This application is a continuation-in-part of U.S. Pat. application Ser. No. 08/667,673, filed Jun. 21, 1996, entitled SLOW RELEASE COOLANT FILTER, which was allowed Jan. 22, 1997.

BACKGROUND OF THE INVENTION

The present invention relates generally to the design of coolant filters which are used in the operation of motor vehicles, such as motor vehicles including a diesel engine. More specifically the present invention relates to the design of a coolant filter with a chemical additive disposed within the filter which is released into the circulating coolant. The chemical additive is referred to as a supplemental coolant additive or SCA and is used to maintain the desired amount of corrosion inhibitors in the coolant during engine operation.

The typical approach in the past was to change the coolant filter at the oil drain interval. This would normally be a two-month interval involving a mileage interval of between 15,000 and 20,000 miles. Under these conditions, a moderate amount of SCA could be introduced into the system and it would be able to maintain the desired level of corrosion inhibitors in the coolant. As the SCA is depleted and the coolant concentration of inhibitors decreases, it is likely time for a filter change and a new SCA charge is then available to be delivered to the circulating coolant when the new filter is installed.

Recently there has been an interest in dramatically extending the coolant service interval from the typical two months interval to a once-a-year interval. This in turn increases the interval mileage from 15,000–20,000 miles up to approximately 120,000 miles, or more. A coolant filter which is designed to be changed once a year contains a relatively large amount of SCA. For the most part, filters of conventional design add the SCA into the coolant during the first few hundred miles of operation. This fairly rapid addition (dissolving) of the SCA into the coolant is directly related to the creation of certain undesirable "side effects". These referenced side effects can create certain problems for the corresponding engine and should be avoided if possible.

One side effect to be avoided is coolant additive precipitation which in turn can cause water pump leakage. Another side effect is a less uniform level of liner pitting protection. By means of the present invention which involves a slow release mechanism for the SCA, the SCA is able to be added to the coolant slowly, over at least the first 25,000 miles of vehicle operation rather than all during the first few hundred miles of vehicle operation. The slow release of SCA helps to avoid coolant additive precipitation and in turn helps to avoid water pump leakage. The present invention also enables a more uniform level of liner pitting protection to be maintained.

Coolant filters of the type incorporating the present invention are relatively large and would contain approximately ½ pound of SCA as a fresh charge with a new filter. With earlier extended-interval filters, this ½ pound of SCA would all be introduced into the coolant in two to three hours of vehicle operation. When this much SCA hits the system all at once as a slug, it is slow to absorb because it is more than what the coolant can handle. As a result, the SCA is likely to come out of solution as a precipitate and collect as a solid. What can result from this are precipitate deposits on the water pump face seals. Since these face seals ride on each other at approximately 1800 RPM, a fairly warm environment is created during vehicle operation which can actually bake the chemical solids of the precipitated SCA onto the facing surfaces of the face seals. The build up of solids on the facing surfaces will cause leakage to occur which is an undesirable side effect of dumping the SCA into the coolant too rapidly.

One situation which complicates and exacerbates this particular side effect involves the specific chemical additives which are used in the SCA composition. These specific chemical additives include silicates and MBT. Since these chemical additives are not highly soluble, nor as soluble as other potential SCA additives which may have been previously used, there is an even greater tendency for these additives to either not go into solution or to precipitate out of solution. Thus, while the "slug" concentration which is being dumped into the coolant in such a short time is likely to precipitate out based solely on concentration, a less soluble additive contributes to the formation of a precipitate.

With regard to the side effect that relates to liner pitting protection, it should be understood that liner "pitting" is a special type of corrosion that results when the liners which are bathed in coolant vibrate. Since piston movement is not perfectly vertical, there is a slight rocking action or slap which creates the liner vibration. Vapor bubbles are created as the coolant is pulled away from the liner. These vapor bubbles implode and a type of shock wave hits the surface of the liner at points where vibration is the greatest. The problem with pitting is that if it continues, it can perforate the liner and admit coolant into the crankcase.

The SCA is helpful to reduce liner pitting by passivating the liner surface. The nitrites in the SCA form a tough oxide coating on the surface of the liner and if enough nitrite is present, pitting can be virtually eliminated. The preferred approach for creating and maintaining the tough oxide coating is to slowly release the SCA into the coolant over two to three months (approximately 25,000 miles). With the prior approach of rapidly dumping the SCA into the coolant, there will be a greater loss of SCA due to system leakage and thus less of the chemical is available for creating the tough oxide layer.

System leakage is a fairly common occurrence. Due to a variety of reasons which include loose hoses and system interface losses, the coolant system may loose between 1 and 2 gallons of coolant solution per month. If the SCA is added into the coolant rapidly, then the SCA unit volume concentration is greater than with a slow release. When the 1 to 2 gallons of coolant solution are lost, the amount of SCA which is lost is substantial. As a consequence, the SCA which is lost is never able to perform its intended function of passivating the liner. With a slow release of SCA, the loss due to leakage is more gradual and a majority of the SCA remains available for a longer period of time.

The design challenge which is addressed by the present invention is how to slowly release the SCA into the coolant. The present invention solves this design challenge in several ways, each of which is believed to provide a novel and unobvious solution.

Over the years a number of coolant filters have been designed, some of which incorporate a supplemental coolant additive, and the following listed patents are believed to provide a representative sampling of these earlier designs:

| PATENT NO. | PATENTEE | ISSUE DATE |
| --- | --- | --- |
| 5,435,346 | Tregidgo et al. | Jul. 25, 1995 |
| 5,395,518 | Gulsvig | Mar. 7, 1995 |
| 3,897,335 | Brandt | Jul. 29, 1975 |
| 3,369,666 | Hultgren et al. | Feb. 20, 1968 |
| 5,094,745 | Reynolds | Mar. 10, 1992 |
| 4,366,057 | Bridges et al. | Dec. 28, 1982 |
| 4,452,697 | Conrad | Jun. 5, 1984 |
| 4,782,891 | Cheadle et al. | Nov. 8, 1988 |
| 5,024,268 | Cheadle et al. | Jun. 18, 1981 |
| 5,114,575 | Yano et al. | May 19, 1992 |
| 5,209,842 | Moor | May 11, 1993 |
| 5,009,848 | Secretarski et al. | Apr. 1991 |
| 5,378,355 | Winkier | Jan. 1995 |
| 4,975,284 | Stead et al. | Dec. 1990 |
| 3,645,420 | Alexander et al. | Feb. 1972 |
| 4,717,495 | Hercamp, et al. | Jan. 5, 1988 |

In addition, the Penray Company of Wheeling, Ill. has offered for sale a "Need Release" filter which is intended to be an extended service interval coolant filter. With certain technical audiences this filter has been described as having a "delayed release" feature. The "Need Release" filter was originally offered by Nalco Chemical Company of Naperville, Ill. It is believed that the Nalco Chemical business has been acquired by the Penray Company. The "Need Release" filter includes a release mechanism which is based on magnesium corrosion. The filter has three large SCA pellets which are separated by magnesium plates all of which are housed in a copper sleeve or tube. Copper is used in order to establish a strong galvanic couple with the magnesium which promotes corrosion of the magnesium.

Other than operating on a different release principle and other than being structurally different from the claimed invention, the "Need Release" filter includes several drawbacks which are not present with the present invention. For example, the magnesium can dissolve into the coolant where it can cause additive precipitation and deposits in the cooling system. Another concern is that lube oil can on occasion leak into the coolant which will result in an oily film on the magnesium plate. This prevents the plate from corroding and releasing the SCA. The "Need Release" filter must be used with the proper HD type antifreeze and thus the product will not work properly when the coolant is only water. A further drawback is that the magnesium plate can build up a scale which stops corrosion which in turn prevents SCA release.

Although a variety of coolant filter designs have in the past been offered for sale and while extended service interval coolant filters are now receiving more attention, the present invention is novel and unobvious. The present invention provides a desirable solution to the design task which is directed to the avoidance of the undesirable side effects which have been described.

SUMMARY OF THE INVENTION

A coolant filter for use in filtering a coolant solution which flows through the coolant filter according to one embodiment of the present invention comprises a filter housing assembly defining a flow outlet, a filter element positioned inside of the filter housing assembly and defining a hollow interior space, a source of a supplemental coolant additive which is positioned within the hollow interior space, and a slow release arrangement which is disposed between the source of supplemental coolant additive and the flow outlet for controlling the rate of release of the supplemental coolant additive into the coolant solution.

One object of the present invention is to provide an improved coolant filter.

Related objects and advantages of the present invention will be apparent from the following description.

DESCRIPTION OF THE PREFERRED EMBODIMENT

Figure 1:
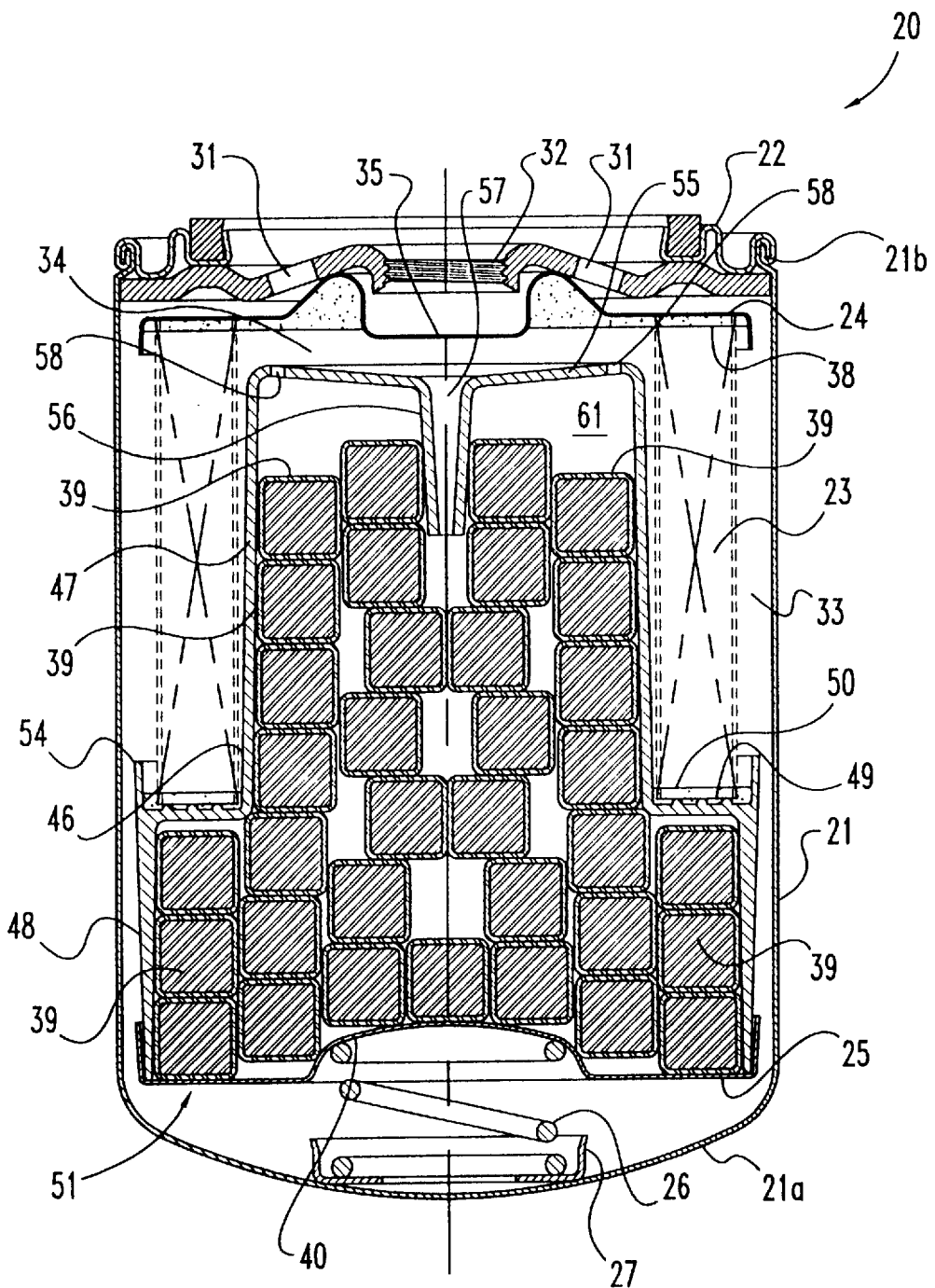
FIG. 1 is a front elevational view in full section of a coolant filter according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a coolant filter 20 according to one embodiment of the present invention. The illustrated construction of filter 20 is intended to include the basic components and construction which would be typical of such filters, with the exception of the supplemental coolant additive (SCA) and the slow release mechanism associated with the SCA. The basic components of filter 20 include the annular outer housing 21, nutplate 22, substantially cylindrical filter element 23, outlet endplate 24, base endplate 25, support spring 26, and spring protector 27.

The outer housing 21 has a closed base end 21a and an open outlet end 21b which is crimped to the outer edge periphery of nutplate 22. The crimped combination creates a filter housing assembly. Nutplate 22 provides the inlet flow openings 31 for coolant to enter the filter 20 and the internally threaded outlet aperture 32 which is defined by nutplate 22 provides the flow exit for the filtered coolant. The outlet endplate 24 is shaped and arranged relative to the inside surface of the nutplate so as to direct the incoming flow of coolant into annular space 33 and from there through the filter element 23 in a radially inward direction into interior space 34. Interior space 34 leads through the flow control orifice 35 in the outlet endplate 24 to outlet aperture 32. Outlet endplate 24 is bonded to the adjacent end 38 of filter element 23 by a layer of adhesive. This layer of adhesive also seals off the end of the filter element in order to prevent any undesirable bypass or short circuit flow of coolant.

Base endplate 25 provides a support and seat for the filter element 23 as well as for the components associated with the present invention, including the SCA which is provided in the form of a plurality of coated tablets or pellets 39. The illustrated pellets 39 are roughly cubic in form and are completely coated in order to retard the release of SCA into the coolant. Spring 26 is seated inside of spring protector 27 and pushes up against the receiving depression 40 which is formed in the center of base endplate 25.

Figure 2:
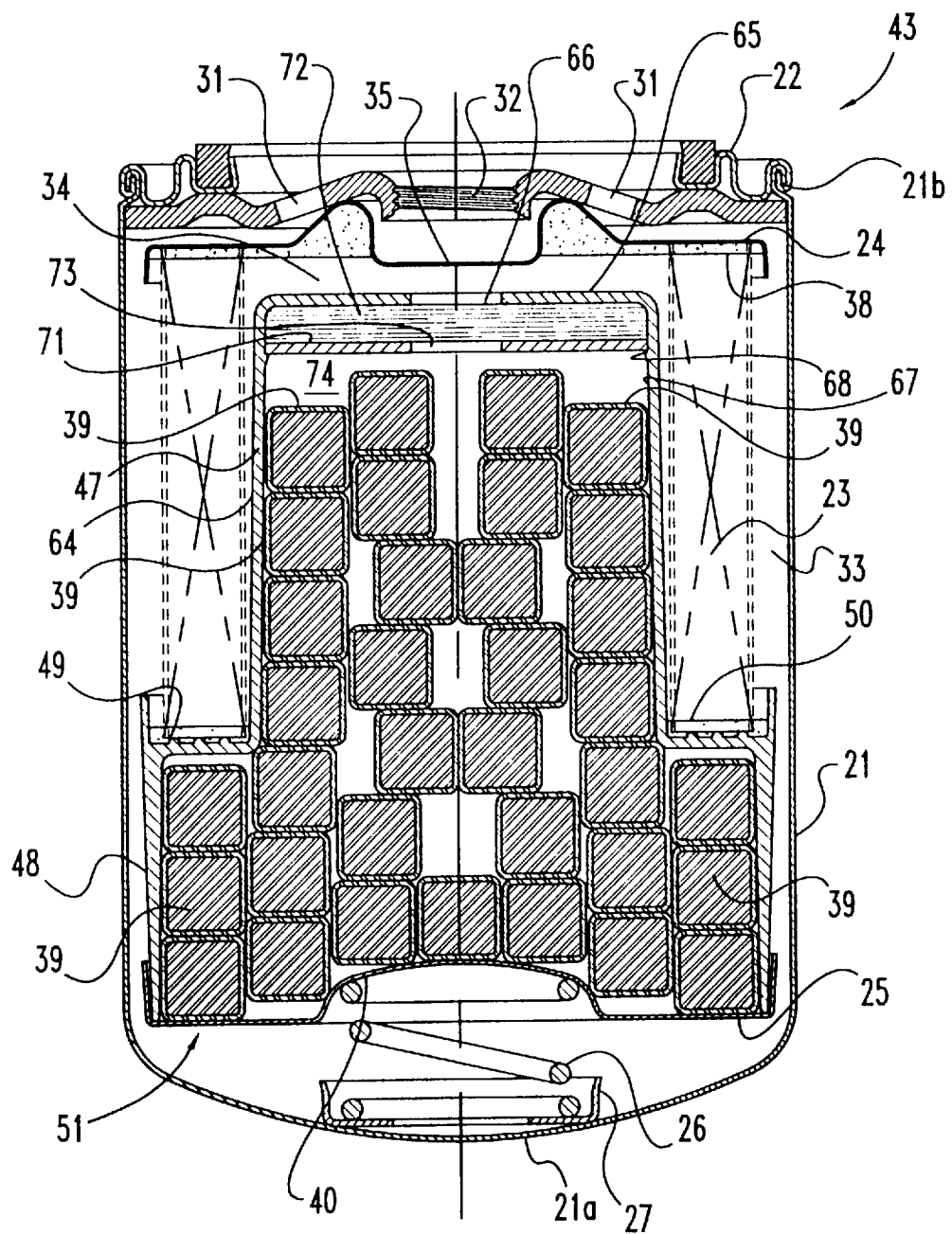
FIG. 2 is a front elevational view in full section of a coolant filter according to another typical embodiment of the present invention.

The foregoing description of the basic filter components and construction of coolant filter 20 provided with regard to the FIG. 1 illustration is applicable to coolant filter 43 which is illustrated in FIG. 2. Accordingly, the same reference numbers are used for the same components. The differences between filters 20 and 43 are embodied in the structures which house the plurality of coated pellets 39.

Referring to FIG. 1, coolant filter 20 includes a molded, unitary endplate 46 which is configured with an inner, substantially cylindrical portion 47 and an outer, substantially cylindrical portion 48. The unitary endplate 46 defines an interior chamber which is filled with coated pellets 39 and then enclosed by means of base endplate 25. Annular shelf 49 provides a substantially flat surface for the receipt and support of filter element 23. A layer of adhesive applied between the adjacent end 50 of the filter element 23 and shelf 49 serves the dual purpose of bonding the filter element in place and sealing end 50 of the filter element. The outside diameter size of portion 47 is slightly smaller than the inside diameter size of filter element 23. Base endplate 25 fits across the open end 51 of endplate 46 and up around the side so as to close off the open end 51. A relatively short cylindrical wall 54 which is substantially concentric to inner portion 47 creates an annular channel to hold in the adhesive which is applied to shelf 49.

Inner portion 47 includes an upper wall 55 which is adjacent the outlet end of the housing and is formed with an inwardly, axially protruding and centered, tapered diffusion tube 56. Diffusion tube 56 defines a tapered diffusion passage or orifice 57 which extends therethrough and establishes a passageway of communication between the interior chamber of endplate 46 and interior space 34. A plurality of air vents 58 are disposed in upper wall 55. There is a slight conical draft to upper wall 55 leading from the air vents inwardly to diffusion orifice 57. Upper wall 55 is positioned between the source of SCA (pellets 39) and outlet aperture 32 and the point of exit from diffusion orifice 57 into interior space 34 is coincident with the conical portion of upper wall 55. This arrangement necessitates that any SCA which is released from within the interior chamber into the coolant must flow through the diffusion tube 56.

As is illustrated, the unitary endplate 46 as seated within and on base endplate 25 creates an enclosed chamber 61 with the only openings into the enclosed chamber being the diffusion orifice 57 and air vents 58. The enclosed chamber 61 is filled with coated SCA pellets 39 which provide a timed release of a supplemental coolant additive (SCA) which gradually goes into the coolant.

Each coated pellet 39 includes an outer coating which encases a selected SCA composition. The outer coating may be hard or soft and while each style has its own mechanism for exposing the encased SCA to the coolant, either style is suitable for use with the present invention. The typical and preferred coatings are polyvinylidene chloride (PVDC) and polyvinyl acetate (PVA). The PVDC material is a hard coating which releases when coolant gradually soaks through the coating. The coolant causes the SCA inside of the coating to swell and eventually this causes the coated pellet to crack open. This then exposes the SCA inside to the coolant. The PVA material is a soft coating which releases by a different mechanism. While coolant also penetrates the coating, the coating is soft and pliable and does not crack open. Instead the coolant diffuses through the coating, dissolves some of the SCA and then escapes back out of the coated pellet. While both the PVDC and PVA coating materials are insoluble coatings, the present invention is compatible with soluble coating materials. Insoluble coatings are preferred because there are no concerns about corrosion or deposits. With a soluble coating, there could be corrosion or deposit problems as the soluble coating builds up in the coolant. The SCA material which is encased in each of the coated pellets is preferably a modified version of DCA-4 which is a phosphate/molybdate/ nitrite type SCA recommended by Cummins Engine Company, Inc. of Columbus, Ind. This SCA material is described in U.S. Pat. No. 4,717,495 which issued Jan. 5, 1988 to Hercamp, et al. The U.S. Pat. No. 4,717,495 is hereby incorporated by reference.

As the coolant flows through the coolant filter 20, a portion of the coolant fills the enclosed chamber 61 and begins the process of breaking through the outer coating of the pellets 39. As the SCA is exposed pellet-by-pellet and gradually goes into solution, it will have a higher concentration inside of chamber 61 than outside of chamber 61 in interior space 34. Accordingly, there will be a lower concentration of the SCA material in the flowing coolant and there is a natural tendency of different concentration levels to flow in an effort to achieve equilibrium. This causes the higher concentration of SCA in solution with the coolant to gradually flow out of the enclosed chamber 61 by way of diffusion orifice 57. By including the diffusion tube 56 and the defined diffusion orifice 57 as part of upper wall 55, there is a restricted opening for the migration of the higher concentration solution out of the enclosed chamber 61. The air vents 58 allow any air bubbles to escape without having to flow through the diffusion orifice 57.

If the diffusion orifice 57 was made larger or if upper wall 55 was removed from the unitary endplate 46, the higher concentration mixture would enter the flow of coolant (lower concentration) at a faster rate, thereby speeding the rate at which all of the SCA is introduced into the coolant. In turn, this would reduce the time and mileage interval and could preclude this modified design from achieving the objective of a slow release of the SCA over the first 25,000 miles of vehicle operation. Although the initial 25,000 miles is the target objective, the longer the period of release of the SCA into the coolant, the less risk there will be of encountering any of the undesirable side effects.

One alternative to the design of the FIG. 1 coolant filter is to replace the plurality of coated pellets 39 with a fewer number of much larger pellets or tablets. By reducing the total surface area of the coating for a particular mass of SCA and by reducing the total surface area of the SCA, there is a slower rate of dissolving of the SCA into the coolant. While this slower dissolving rate is preferable over a faster rate, the preferred embodiment includes the use of mechanical means to slow down the process, such as configuring endplate 46 with the diffusion tube 56 and diffusion orifice 57.

By means of the diffusion tube 56 and diffusion orifice 57, a flow-limiting orifice is provided which limits the engine coolant contact with the SCA and thus a slower rate and a longer mileage interval for the SCA to dissolve into the engine coolant. As the SCA dissolves, there is a higher concentration of SCA in the SCA and coolant mixture inside of the enclosed chamber 61. The diffusion orifice 57 then limits the rate at which this higher concentration solution diffuses into the main flow stream of coolant which has a lower concentration of SCA.

Referring now to FIG. 2, another embodiment of the present invention is illustrated. As has been previously mentioned, the basic filter components of filter 43 are the same as those of filter 20 and accordingly the same reference numbers have been used. Located within filter 43 is a molded, unitary endplate 64 which for the most part is sized and shaped the same as endplate 46 with one important difference. The upper wall 55, diffusion tube 56, diffusion orifice 57, and air vents 58 have been replaced by a double wall structure which includes a semipermeable membrane wafer sandwiched therebetween. The remainder of endplate 64 is virtually identical to endplate 46 including the remainder of inner portion 47, outer portion 48, shelf 49, and open end 51. Accordingly, the same reference numbers have been used to identify the common components between the FIG. 1 coolant filter and the FIG. 2 coolant filter. Further, the positioning of the FIG. 2 filter element 23 is the same as in FIG. 1 including the use of an adhesive to seal closed ends 38 and 50 and bond those ends to outlet endplate 24 and to shelf 49, respectively.

With regard to the differences between the FIG. 1 and FIG. 2 embodiments, the inner portion 47 includes a unitary upper wall 65 which defines centrally therein an orifice 66. The inside surface 67 of portion 47 is molded with a small annular lip 68 which serves as a retainer for circular plate 71. Plate 71 functions as a second wall in cooperation with upper wall 65 in order to hold in position therebetween a substantially cylindrical, diffusion or osmotic wafer 72. The preferred material for diffusion wafer 72 is microporous polypropylene. Plate 71 defines centrally therein an orifice 73 which is aligned with orifice 66. This combination permits the gradual flow of coolant into enclosed chamber 74 in order to act on pellets 39. Diffusion wafer 72 is positioned between the source of SCA (pellets 39) and the outlet aperture 32 necessitating that the release of SCA into the coolant must pass through wafer 72. By configuring diffusion wafer 72 from a semipermeable membrane material, the rate of flow through orifices 66 and 73 in either direction is restricted and slowed. While coolant only gradually seeps into chamber 74, any higher SCA concentration solution which is created in chamber 74 only gradually seeps out of chamber 74 into the primary flow path of the lower SCA concentration coolant. The use of a semipermeable membrane in the form of wafer 72 provides a slow release of SCA into the coolant flow stream and thereby enables the SCA to be released more gradually and over a longer time/mileage interval. The slow release of SCA into the coolant provides a coolant filter design which is able to avoid the undesirable side effects which have been discussed in connection with other earlier systems and other earlier filter designs.

Figure 3:
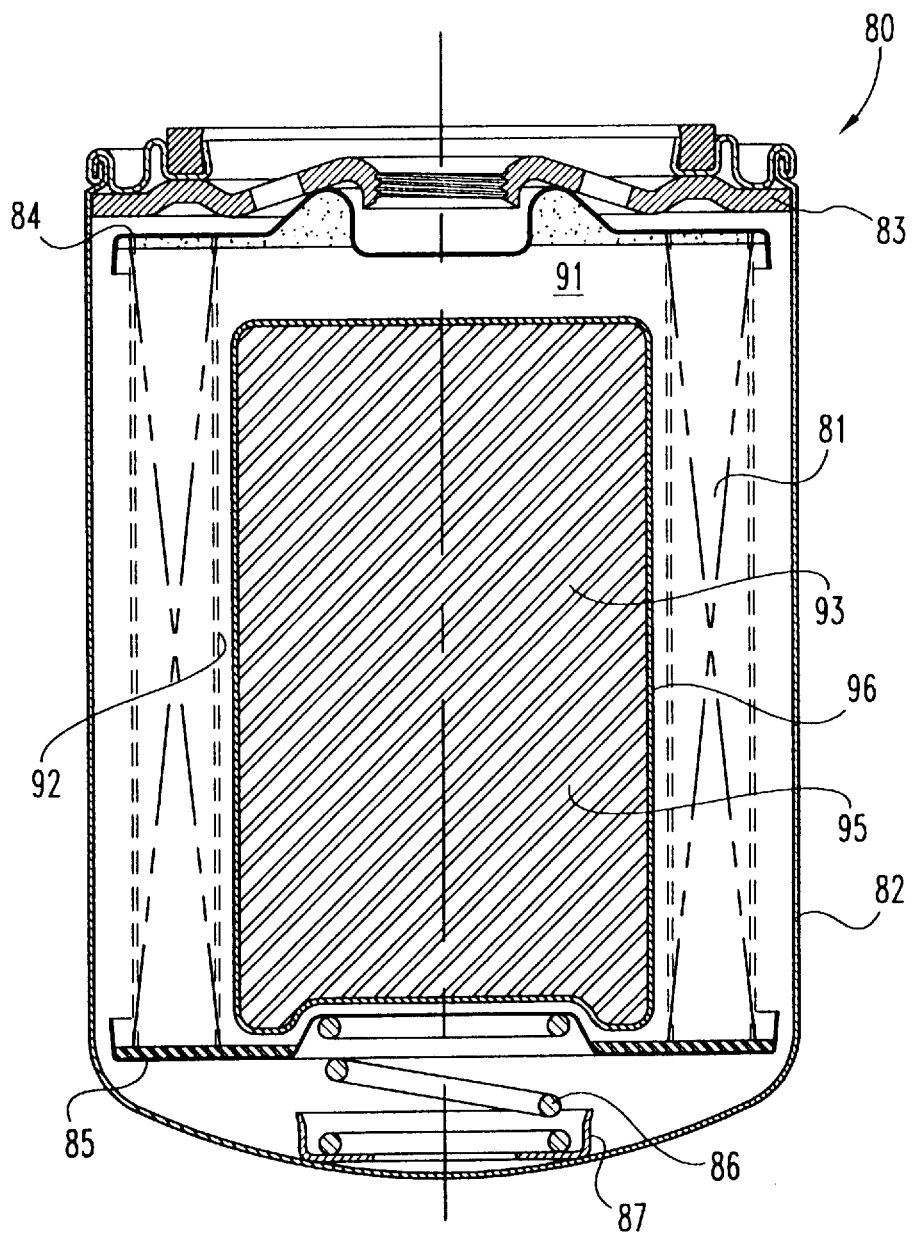
FIG. 3 is a front elevational view in full section of a coolant filter according to another typical embodiment of the present invention.
Figure 4:
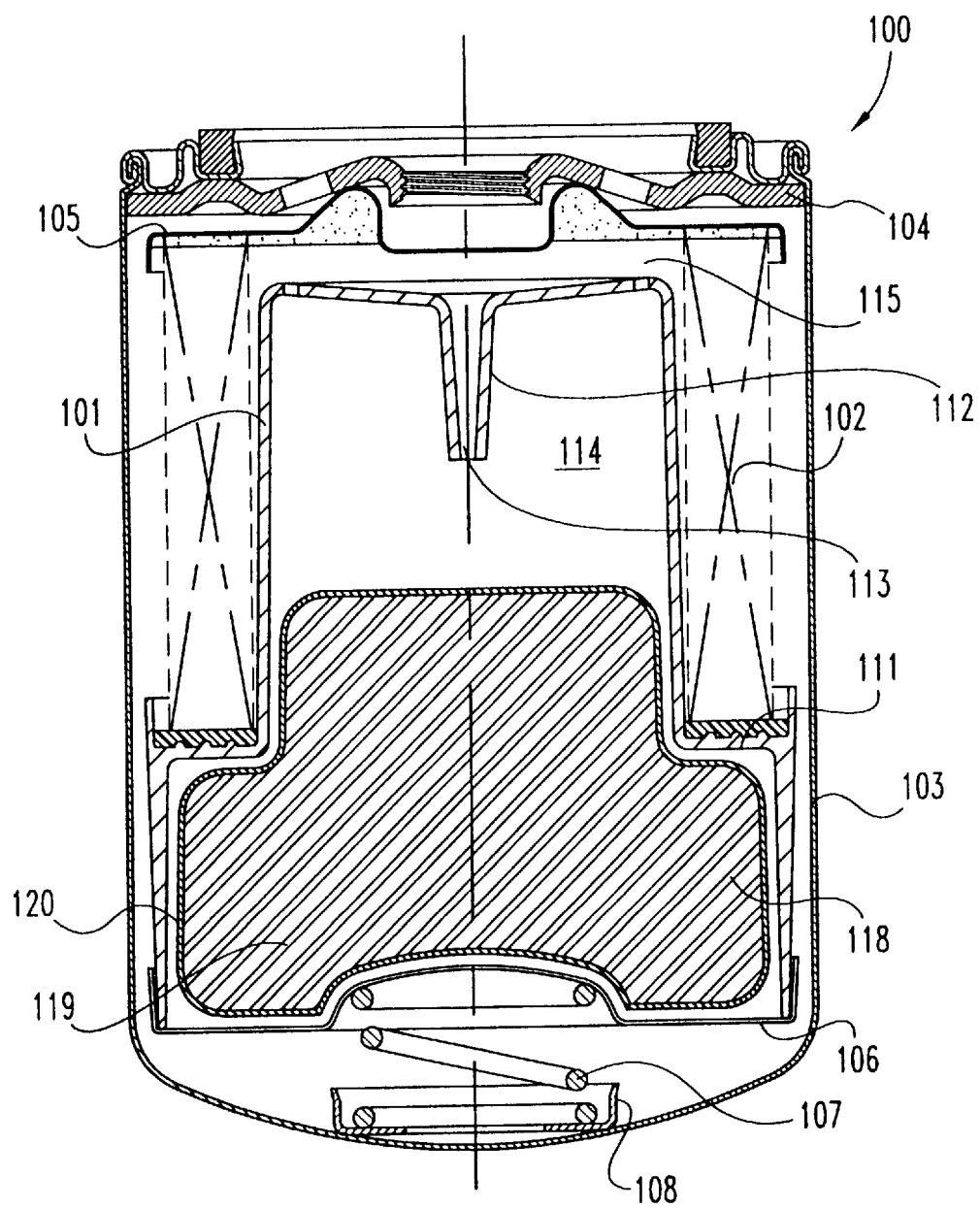
FIG. 4 is a front elevational view in full section of a coolant filter according to yet another typical embodiment of the present invention.

As described herein with reference to FIGS. 3 and 4, it is possible to replace the coated pellets 39 with some other form of SCA, even though the use of the coated pellets 39 is quite satisfactory. The use of the smaller pellets allows a larger mass of SCA to be loaded into the enclosed chamber without any particular regard to the size or shape of the enclosed chamber 61/74. If a larger tablet or tablets were used, then the size and shape of the enclosed chamber would be a concern, at least if the available tablet sizes were limited.

According to the first embodiment of the present invention a diffusion tube and diffusion orifice may be used to slow the release of SCA into the coolant. This mechanical arrangement may be used with a plurality of smaller SCA pellets or with larger SCA tablets or with some other form of SCA. In a second embodiment of the present invention, a semipermeable or microporous membrane wafer is sandwiched between an upper wall and a retaining plate and provides the slow release mechanism due to the composition of the wafer. This mechanical arrangement may be used with a plurality of smaller SCA pellets or with larger SCA tablets or with some other form of SCA. Still further embodiments of the present invention are illustrated in FIGS. 3 and 4.

Referring to the illustrated embodiments of FIGS. 1 and 2, it will be seen that there is in fact a coolant filter cartridge which is created and present in both embodiments. While filters 20 and 43 are configured as disposable units, it would be possible to configure the outer housing and the nutplate as separable members allowing the filter cartridge to be removed and replaced. Accordingly, the referenced coolant filter cartridge includes the filter element 23, the outlet endplate 24, the base endplate 25, the source of coated SCA pellets 39, and a corresponding unitary endplate 46 or 64.

With reference to FIGS. 3 and 4 two other embodiments of the present invention are illustrated. In FIG. 3 the coolant filter 80 has a construction which is similar to coolant filter 20 with the primary differences being the omission of endplate 46 in filter 80 and extending the length of the filter element 81. Filter 80 includes annular outer housing 82, nutplate 83, filter element 81, outlet endplate 84, base endplate 85, support spring 86, and spring protector 87. These components have a construction, assembly relationship, and function in a virtually identical fashion to their corresponding components in coolant filters 20 and 43. Endplates 84 and 85 are adhesively bonded to their respective ends of filter element 81 so as to define a hollow interior space.

The elimination of endplate 46 leaves the hollow interior 91 of filter element 81 open between the two endplates 84 and 85. The hollow interior 91 is defined by cylindrical centertube 92 which functions as an inner liner for the filter element. Positioned within the hollow interior 91 is SCA module 93 which is designed for the slow release of a supplemental coolant additive. SCA module 93 provides yet another SCA release mechanism and packaging concept for the present invention.

SCA module 93 includes a supply 95 of SCA contained within an osmotic film enclosure 96 which can be equated to a sealed bag or pouch. The supply 95 of SCA can be in the form of a paste, powder, or pellet. If a pellet form is selected, the size can range from a very small granule, roughly the size of a BB, to a much larger tablet. The osmotic film used for enclosure 96 is totally insoluble in the coolant and its porosity allows the coolant only limited contact with the SCA which is disposed within the enclosure 96 regardless of the SCA form. Alternatively, the osmotic film can be selected so as to be only slightly soluble in the coolant. Another option, though not necessarily the preferred option, is to use an osmotic film which is totally soluble. The preferred material for the osmotic film is a high molecular weight polyethylene oxide. Alternatively, a polyvinyl acetate or other polymetric film can be used to provide the slow release mechanism of enclosure 96.

As the SCA which is within enclosure 96 comes in contact with the coolant, regardless of the form of the SCA, the SCA dissolves (gradually) and releases into the coolant. As this occurs, a concentration gradient of SCA and coolant is created across the osmotic film enclosure 96. This concentration gradient causes the higher concentrations of dissolved SCA to migrate through the wall of the enclosure 96 and blend into the coolant which is flowing through filter 80 and exiting from filter 80. The nature of the osmotic film which creates enclosure 96 ensures that the higher concentration of SCA and coolant very gradually diffuses out of enclosure 96, thereby providing a slow release mechanism for the SCA.

The flexibility of the osmotic film and the nature of the SCA (powder, paste, or pellet) permits the SCA module to be shaped into whatever form may be needed or desired in order to fit within the hollow interior of the filter element. Virtually regardless of what volume shape might be provided, the SCA module 93 can simply be stuffed or packed into the volume without concern. It is envisioned that one packaging option for the SCA module is to form it into a sausage shape (link) to allow for maximum versatility. In this style of arrangement, the osmotic film provides the casing of the "sausage" which is then filled with SCA in either powder, paste, or pellet form.

With reference to FIG. 4, coolant filter 100 has a construction which is virtually identical to coolant filter 20, including the same style of unitary endplate 101 as is disclosed for endplate 46 in FIG. 1. Filter element 102 has a size and shape which is substantially the same as filter element 23. The remaining components of coolant filter 100 are virtually identical to the corresponding components of coolant filter 20 as well as coolant filter 80.

Coolant filter 100 further includes annular outer housing 103, nutplate 104, outlet endplate 105, base endplate 106, support spring 107, and spring protector 108. These components have an assembled relationship and function in a virtually identical fashion to their corresponding components in coolant filters 20 and 80. Unitary endplate 101 includes an annular shelf 111 which is adhesively bonded to one end of filter element 102. The opposite end of the filter element is adhesively bonded to the outlet endplate 105. Endplate 101 further includes a tapered diffusion tube 112 which creates and defines a tapered diffusion passage 113 which establishes flow communication between the hollow interior 114 of endplate 101 and interior space 115.

Positioned within the hollow interior 114 is SCA module 118 designed for the slow release of SCA. Module 118 includes a supply 119 of SCA material contained within an osmotic film enclosure 120. Other than its final form which is shaped to fit within the defined hollow interior 114, SCA module 118 is virtually identical to SCA module 93. These two SCA modules are substantially identical as to materials and functions as well as to their respective slow release mechanisms, taking into consideration the material options and alternative forms for the SCA as described above. The material which is used for the osmotic film for enclosure 120 can be identical to that material used for the osmotic film of enclosure 96. In FIG. 4, the use of endplate 101 and its diffusion tube 112 creates an additional slow release mechanism.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A coolant filter for use in filtering a coolant solution which flows through the coolant filter and being designed for the release of a supplemental coolant additive into said coolant solution, said coolant filter comprising:
   a filter housing assembly defining a flow outlet and flow inlet means;
   a filter element positioned inside said filter housing assembly, said filter element defining a hollow interior space;
   a source of supplemental coolant additive positioned within said hollow interior space; and
   slow release means disposed between said source of supplemental coolant additive and said flow outlet for controlling the rate of release of said supplemental coolant additive into said coolant solution, wherein said slow release means includes an osmotic film enclosure which encloses the source of supplemental coolant additive.

2. The coolant filter of claim 1 wherein the form of said source of supplemental coolant additive is a powder.

3. The coolant filter of claim 1 wherein the form of said source of supplemental coolant additive is a paste.

4. A coolant filter for use in filtering a coolant solution which flows through the coolant filter and being designed for the release of a supplemental coolant additive into said coolant solution, said coolant filter comprising:
   a filter housing assembly defining a flow outlet and flow inlet means;
   a filter element positioned inside said filter housing assembly;
   an endplate member which is configured with an interior chamber;
   a source of supplemental coolant additive positioned within said interior chamber; and
   slow release means disposed between said source of supplemental coolant additive and said flow outlet for controlling the rate of release of said supplemental coolant additive into said coolant solution, wherein said slow release means includes an osmotic film enclosure which encloses a source of supplemental coolant additive.

5. The coolant filter of claim 4 which further includes a diffusion tube comprising part of said endplate member and defining a diffusion orifice which is disposed between the source of supplemental coolant additive and said flow outlet.

6. The coolant filter of claim 4 wherein the form of said source of supplemental coolant additive is a powder.

7. The coolant filter of claim 4 wherein the form of said source of supplemental coolant additive is a paste.

8. A coolant filter cartridge for installing into a filter housing assembly for the filtering of a coolant solution, said filter housing assembly defining a flow outlet and flow inlet means and said coolant filter cartridge being designed for the release of a supplemental coolant additive into said coolant solution, said coolant filter cartridge comprising:
   a filter element having a first end and opposite thereto a second end;
   a first endplate bonded to the first end of said filter element;
   a second endplate bonded to the second end of said filter element, so as to define an interior chamber;
   a source of supplemental coolant additive positioned within said interior chamber; and
   slow release means disposed between said source of supplemental coolant additive and said flow outlet for controlling the rate of release of said supplemental coolant additive into said coolant solution, wherein said slow release means includes an osmotic film enclosure which encloses the source of supplemental coolant additive.

9. The coolant filter cartridge of claim 8 wherein the form of said source of supplemental coolant additive is a powder.

10. The coolant filter cartridge of claim 8 wherein the form of said source of supplemental coolant additive is a paste.

* * * * *